(12) United States Patent
Chen

(10) Patent No.: US 10,520,778 B2
(45) Date of Patent: Dec. 31, 2019

(54) LIQUID CRYSTAL LENS AND DISPLAY DEVICE

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 71 days.

(21) Appl. No.: 15/739,986

(22) PCT Filed: Aug. 14, 2017

(86) PCT No.: PCT/CN2017/097316
§ 371 (c)(1),
(2) Date: Dec. 26, 2017

(87) PCT Pub. No.: WO2018/133400
PCT Pub. Date: Jul. 26, 2018

(65) Prior Publication Data
US 2018/0373101 A1    Dec. 27, 2018

(30) Foreign Application Priority Data

Jan. 22, 2017 (CN) .......................... 2017 1 0047188

(51) Int. Cl.
*G02F 1/1343* (2006.01)
*G02F 1/29* (2006.01)
(Continued)

(52) U.S. Cl.
CPC ... *G02F 1/134309* (2013.01); *G02B 27/2214* (2013.01); *G02F 1/29* (2013.01); *G02B 26/0875* (2013.01); *G02F 2001/294* (2013.01)

(58) Field of Classification Search
CPC ............ G02B 27/2214; G02B 26/0875; G02B 27/2242; G02B 27/42; G02F 1/29; G02F 2203/22; G02F 2203/24
See application file for complete search history.

(56) References Cited

U.S. PATENT DOCUMENTS

2012/0154463 A1* 6/2012 Hur .................... G02B 27/2214
345/691
2014/0211112 A1    7/2014 Yang et al.
2017/0205644 A1* 7/2017 Wang .................... G02F 1/1333

FOREIGN PATENT DOCUMENTS

CN      102109706 A  *  6/2011
CN      102109706 A     6/2011
(Continued)

OTHER PUBLICATIONS

International Search Report of PCT Patent Application No. PCT/CN2017/097316 dated Nov. 21, 2017.

*Primary Examiner* — Jessica M Merlin

(57) ABSTRACT

This invention relates to a liquid crystal lens and a display device, and the liquid crystal lens includes a first substrate, a second substrate, a first electrode unit, plural electrode units, and a liquid crystal layer. Liquid crystal molecules corresponding to the electrode units form a plurality of lenses under the effect of a controlled electric field produced by the second electrode unit and the first electrode unit, and at least some of the lenses have different structures.

11 Claims, 3 Drawing Sheets

(51) Int. Cl.
    *G02B 27/22* (2018.01)
    *G02B 26/08* (2006.01)

(56) References Cited

FOREIGN PATENT DOCUMENTS

| | | | |
|---|---|---|---|
| CN | 105404067 A | * | 3/2016 |
| CN | 105404067 A | | 3/2016 |
| CN | 205787509 U | | 12/2016 |

\* cited by examiner

FIG. 1

LIQUID CRYSTAL LENS AND DISPLAY DEVICE

FIELD OF INVENTION

The present invention relates to the technical field of displays, in particular to a liquid crystal lens and a display device.

BACKGROUND OF INVENTION

At present, more and more display devices come with a 3D display effect, and the 3D display technology includes an eyeglass-type display technology and a naked-eye display technology. With the convenience of not requiring the wearing of eyeglasses, the naked-eye display technology gradually becomes a main development trend. In the principle of the naked-eye display technology, a grating or lens is used to split the light of an image displayed from a display device, so that human eyes may receive different images to achieve a 3D display effect. At present, the 3D display technology is mainly divided into a parallax barrier technology, a cylindrical lens technology, and a directional light source technology.

In general, a conventional cylindrical lens 3D display device comprises: a liquid crystal display panel and a liquid crystal lens disposed on a display side of the liquid crystal display panel, and the liquid crystal lens forms a plurality of convex lenses under the control of the electrode unit. With the effect of the convex lenses, the images displayed from the liquid crystal display panel and received by human left and right eyes are separated according to the principle of refraction, and transmitted to a user's left and right eyes respectively, so that the user can see a 3D image. Since the user's viewing angle may vary, the images entering into the user's left and right eyes through the conventional cylindrical lens 3D display device may have a cross-talk (wherein the left-eye image enters into the user's right eye, and the right-eye image enters into the user's left eye), and such cross-talk issue of the 3D display device affects the user's viewing experience, and may even cause dizziness in a more serious case.

SUMMARY OF THE INVENTION

Therefore, it is a primary objective of the present invention to provide a liquid crystal lens and display device to overcome the cross-talk issue of the conventional naked-eye 3D display.

To achieve the aforementioned and other objectives, the present invention provides a liquid crystal lens comprising: a first substrate and a second substrate disposed opposite to the first substrate, wherein both of the first substrate and second substrate are curved substrates; a first electrode unit, disposed on the first substrate; a plurality of electrode units, disposed on the second substrate, and including a plurality of electrode units with a first structure and a plurality of electrode units with a second structure, wherein the electrode units with the first structure are disposed on both sides of the second substrate respectively, and the electrode units with the second structure are disposed at a center position of the second substrate, and the electrode units with the first structure include a plurality of electrodes with different widths and orientation interval, and the electrode units with the second structure include a plurality of electrodes with the same width and orientation interval; and a liquid crystal layer, disposed between the first electrode unit and the second electrode unit, wherein a plurality of liquid crystal molecules corresponding to the plurality of the second electrode units form a plurality of lenses under the effect of a controlled electric field produced by the second electrode unit and the first electrode unit, and at least some of the lenses have different structures.

To achieve the aforementioned and other objectives, the present invention further provides a liquid crystal lens, comprising: a first substrate and a second substrate disposed opposite to the first substrate, wherein both of the first substrate and second substrate are curved substrates; a first electrode unit, disposed on the first substrate; a plurality of electrode units, disposed on the second substrate; and a liquid crystal layer, disposed between the first electrode unit and the second electrode unit, wherein a plurality of liquid crystal molecules corresponding to the plurality of the second electrode units form a plurality of lenses under the effect of a controlled electric field produced by the second electrode unit and the first electrode unit, and at least some of the lenses have different structures.

In the liquid crystal lens of the present invention, the second electrode units include an electrode unit with a first structure, and the electrode unit with the first structure includes a plurality of electrodes with different widths and orientation interval.

In the liquid crystal lens of the present invention, the second electrode units further include an electrode unit with a second structure, and the electrode unit with the second structure includes a plurality of electrodes with the same width and orientation interval.

In the liquid crystal lens of the present invention, both of the first substrate and the second substrate have an adjustable curvature.

In the liquid crystal lens of the present invention, when the curvature of the first substrate and the second substrate is changed, the voltage applied to the second electrode unit is changed to form a different controlled electric field.

To achieve the aforementioned and other objectives, the present invention further provides a display device, comprising: a display panel, including a plurality of column pixel units; a liquid crystal lens, disposed on the display panel, and including a first substrate and a second substrate disposed opposite to the first substrate, wherein both of the first substrate and second substrate are curved substrates; a first electrode unit, disposed on the first substrate; a plurality of electrode units, disposed on the second substrate; and a liquid crystal layer, disposed between the first electrode unit and the second electrode unit, wherein a plurality of liquid crystal molecules corresponding to the plurality of the second electrode units form a plurality of lenses under the effect of a controlled electric field produced by the second electrode unit and the first electrode unit, and at least some of the lenses have different structures.

In the display device of the present invention, each second electrode unit at least corresponds to two column pixel units.

In the display device of the present invention, the second electrode units include an electrode unit with a first structure, and the electrode unit with the first structure includes a plurality of electrodes with different widths and orientation interval.

In the display device of the present invention, the second electrode units include an electrode unit with a second structure, and the electrode unit with the second structure includes a plurality of electrodes with the same width and orientation interval.

In the display device of the present invention, both of the first substrate and the second substrate have an adjustable curvature, and when the curvature of the first substrate and the second substrate is changed, the voltage applied to the second electrode unit is changed to form a different controlled electric field.

In an embodiment of the present invention, a plurality of different second electrode units is disposed on the curved substrate, and the voltage formed by the plurality of electrode units and the first electrode unit is used to control the arrangement of the liquid crystal molecules filled in the substrate, so as to form a plurality of different lenses, and the lenses can reduce the cross-talk issue of the naked-eye 3D display. The liquid crystal lens is disposed on a curved display screen to form a display device capable of providing a better 3D display effect and improving the user's viewing experience.

BRIEF DESCRIPTION OF THE DRAWINGS

FIG. 1 is a cross-sectional view of a liquid crystal lens in accordance with an embodiment of the present invention;

DETAILED DESCRIPTION OF ILLUSTRATED EMBODIMENTS

Figure 2:
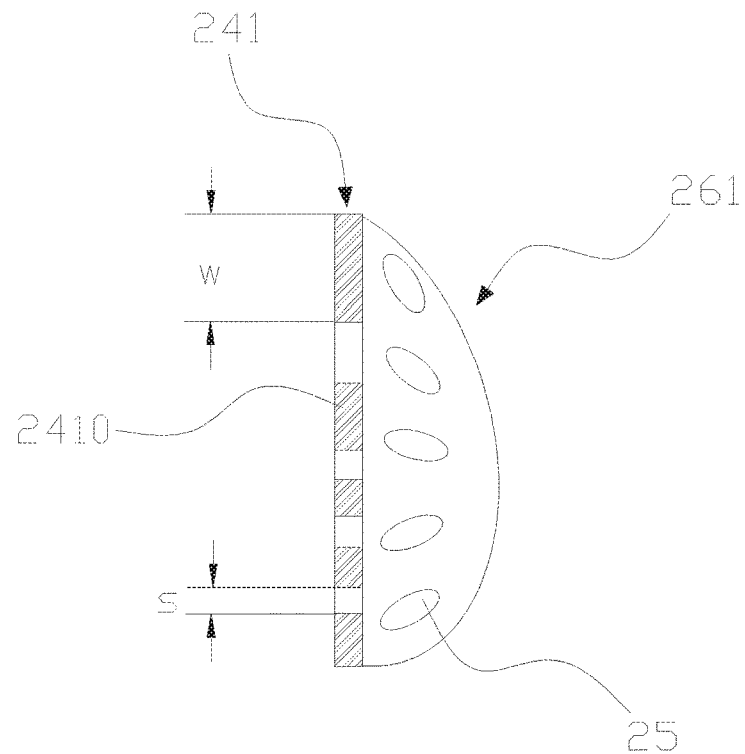
FIG. 2 is a schematic view of applying a voltage to a second electrode unit to form a lens in accordance with an embodiment of the present invention.

The above and other objects, features and advantages of this disclosure will become apparent from the following detailed description taken with the accompanying drawings. Only some embodiments of the present invention have been illustrated in the drawings, but it should be pointed out that many other modifications are conceivable within the scope of the following claims.

Figure 1:
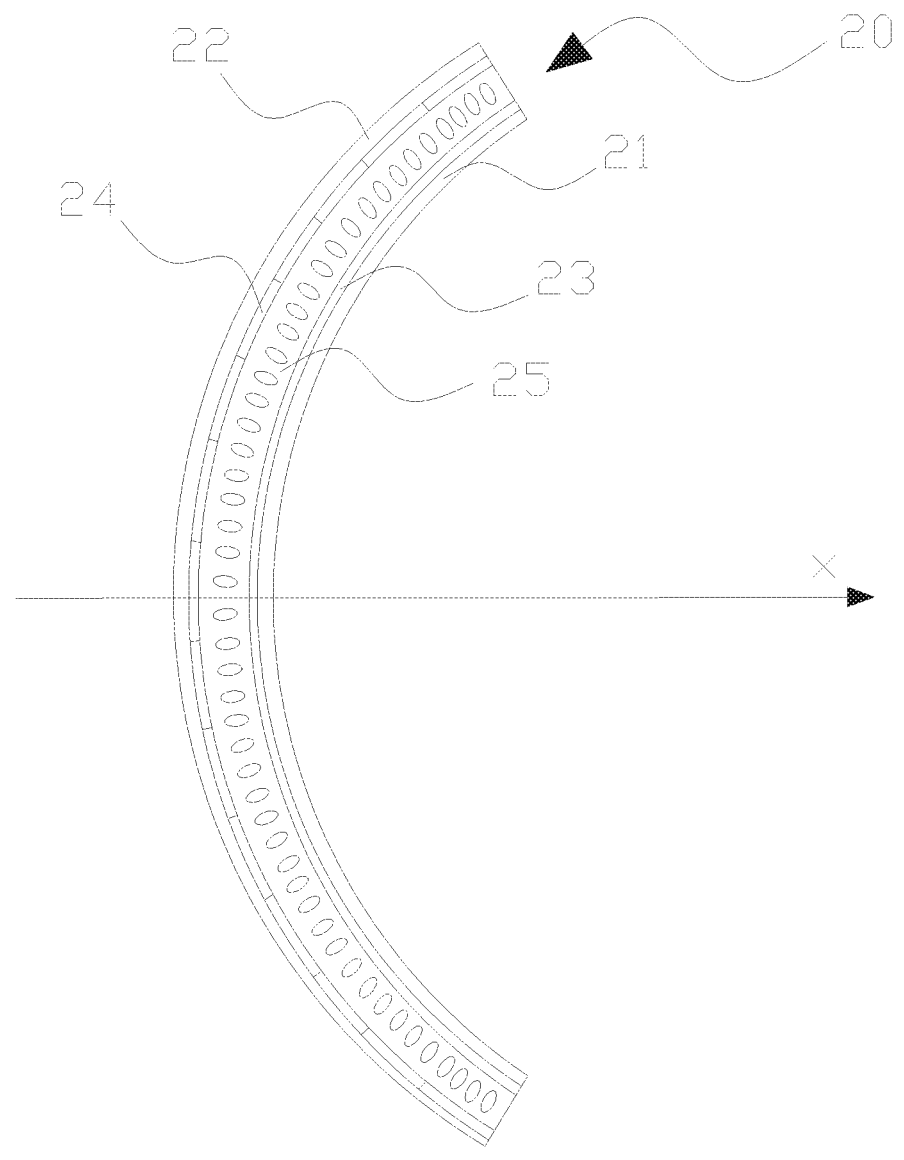

With reference to FIG. 1 for a cross-sectional view of a liquid crystal lens in accordance with an embodiment of the present invention, the liquid crystal lens 20 comprises: a first substrate 21, a second substrate 22, a first electrode unit 23, a plurality of electrode units 24 and a liquid crystal layer 25. The first substrate 21 is disposed opposite to the second substrate 22, wherein both of the first substrate 21 and the second substrate 22 are curved substrates, and the curvature is adjustable. The first electrode unit 23 is disposed on the first substrate 21, and the first electrode unit 23 is a common electrode. The second electrode unit 24 is disposed on the second substrate 22. The liquid crystal layer 25 is filled between the first electrode unit 23 and the second electrode unit 24 (in other words, between the first substrate 21 and the second substrate 22, and when a voltage is applied to the second electrode unit 24, the second electrode unit 24 and the first electrode unit 23 form a control voltage, and the control voltage controls the arrangement of the liquid crystal molecules in the liquid crystal layer and corresponsive to the second electrode unit 24, so as to form a lens, and the electrode units 24 form a plurality of lenses, and at least some of the lenses have different structures. Specifically, a voltage is applied to the second electrode unit 24 having a different structure and the first electrode unit 23 to form a controlled electric field to control the arrangement of the liquid crystal molecules. The liquid crystal lenses with different structures can effectively separate the left- and right-eye images sent out from the display panel according to the refraction principle of light, so that a user can see a 3D display image. Since the liquid crystal lens has a curved structure, therefore the liquid crystal lens used in a planar display panel is a cylindrical lens of the same structure, therefore it is difficult to separate the left- and right-eye images sent out from the display panel or focus the image at a specific position. As a result, the curved display device using the cylindrical lens may cause a serious cross-talk problem. The use of different liquid crystal lenses (either at least some of the lenses have different structures) can overcome the cross-talk problem to provide a better 3D display effect to users.

With reference to FIG. 2 for an embodiment of the present invention, the electrode units 24 include the electrode units 241 having a first structure. In other words, the electrode units 24 are electrode units with the first structure. The electrode units 241 with the first structure include a plurality of electrodes 2410, and the electrodes 2410 have different width W and orientation interval S. When the electrode unit 241 with the first structure receives a voltage and uses the control voltage formed by the first electrode unit 23 to control the lens 261 to be formed by the arrangement of the liquid crystal molecules 25 corresponsive to the electrode unit, and the electrode units with the first structure 241 form a plurality of lenses 261 having different structures. It is noteworthy that the lenses 261 are disposed on both sides of the second substrate, and the electrode units 241 with the first structure include a plurality of electrodes 2410 of different structural parameters. In other words, the second electrodes have the same width and orientation interval which are specifically related to the installation positions of the second electrodes. Wherein, the structure of the lens so formed is related to the curvature, so that the liquid crystal lens used in a curved display screen can provide a better display effect.

Figure 3:
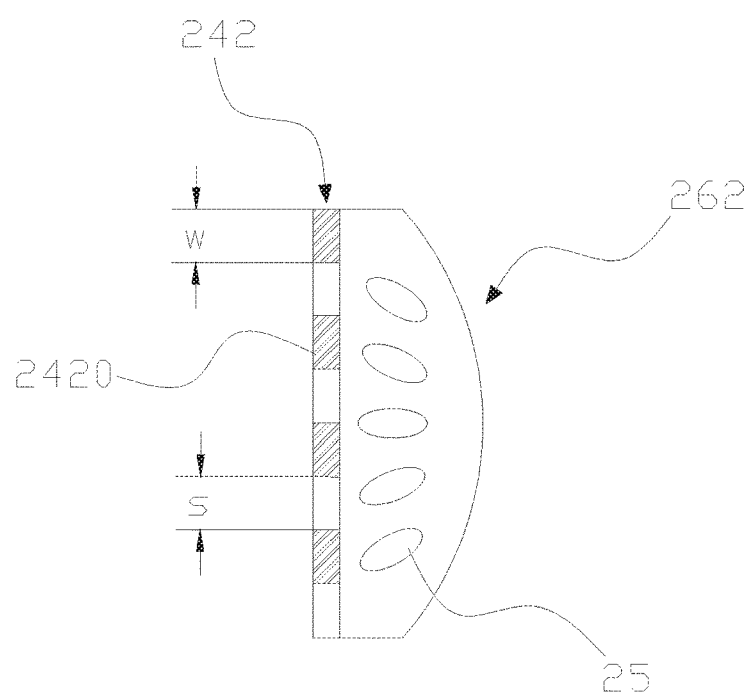
FIG. 3 is a schematic view of applying a voltage to a second electrode unit to form a lens in accordance with an embodiment of the present invention.

In an embodiment of the present invention as shown in FIG. 3, the second electrode units 24 further include an electrode unit 242 having a second structure. The electrode units with the second structure 242 include a plurality of electrodes 2420, and the electrodes 2420 have the same width W and orientation interval S. When the electrode unit 242 with the second structure receives a voltage and uses the control voltage formed by the first electrode unit 23 to control the lens 262 formed by the arrangement of the liquid crystal molecules 25 corresponsive to the electrode unit, so that the electrode units with the second structure 242 will form a plurality of lenses 262 with the same structure. It is noteworthy that the lens 262 is disposed at a center position of the second substrate, which is on both sides of the symmetrical axis or the center of the symmetric axis as shown in FIG. 1.

It is noteworthy that the liquid crystal lens includes a plurality of electrode units with the first structure, or a combination of a plurality of electrode units with the first structure and an electric unit with the second structure according to actual requirements.

In an embodiment of the present invention, the curvature of the first substrate 21 and the second substrate 22 is adjustable to improve the degree of freedom for use. When the curvature of the first substrate 21 and the second substrate 22 is changed, the changed curvature of the first substrate 21 and the second substrate 22 is calculated, while a voltage is applied to the plurality of electrode units 24 to form a different controlled electric field, wherein the voltage is related to the changed curvature. Therefore, a liquid crystal lens with a different structural parameter can be used in a display screen of a different curvature to display a 3D image, so as to further improve the 3D display effect.

In the liquid crystal lens of the aforementioned embodiment, the curved substrate has a plurality of different second electrode units disposed thereon, and the voltage formed by the plurality of electrode units and the first electrode unit is used to control the arrangement of the liquid crystal molecules filled into the substrate, so as to form a plurality of different lenses, and the lenses can reduce the cross-talk problem of the naked-eye 3D display. The liquid crystal lens is disposed on a curved display screen to form a display device in order to provide a better 3D display effect and improve the user's viewing experience.

Figure 4:
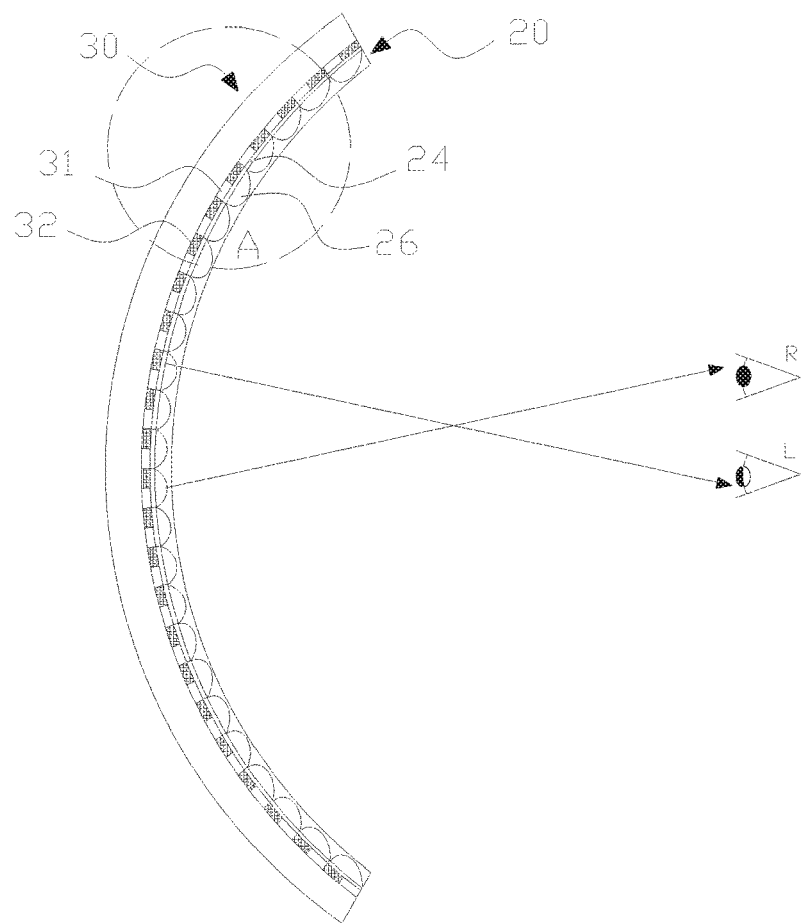
FIG. 4 is a cross-sectional view of a display device in accordance with an embodiment of the present invention.

With reference to FIG. 4 for a cross-sectional view of a display device in accordance with an embodiment of the present invention, the display device comprises a liquid crystal lens 20 and a display panel 30, and the liquid crystal lens 20 is disposed on a display side of the display panel 30, wherein the display panel 30 is a curved display panel and includes a plurality of column pixel units. Specifically, the column pixel units are provided for displaying left- and right-eye images and called a left pixel unit 31 and a right pixel unit 32 respectively. The liquid crystal lens 20 is identical to the liquid crystal lens of the aforementioned embodiment.

The display panel 30 is a liquid crystal display panel, an LED display panel, a QLED display panel, an OLED display panel or a curved display panel.

In the display device of this embodiment of the present invention, each second electrode unit at least corresponds to two column pixel units for displaying the left and right images and further comprises a plurality of column pixel units, and the quantity of the column pixel units is not limited in this invention, but is set according to the display effect and actual manufacturing process.

Figure 5:
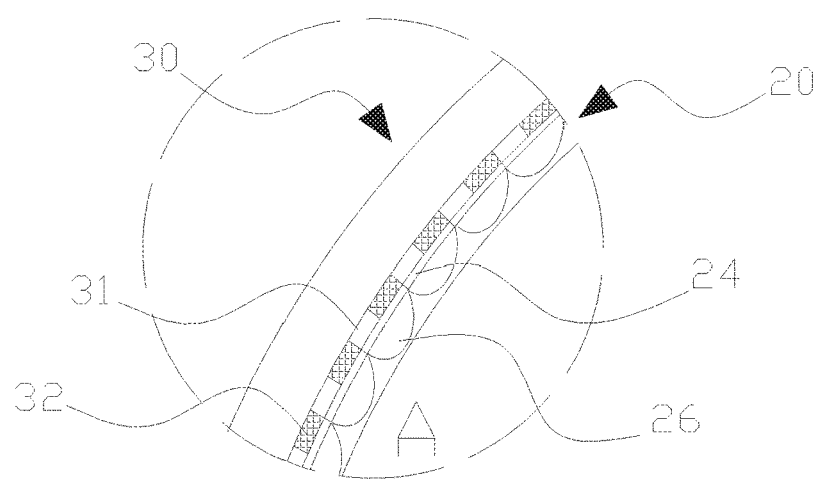
FIG. 5 is a blowup view of Area A of FIG. 4.

With reference to FIG. 5 for a blowup view of Section A of a display device operated in a specific operating process, the second electrode unit 24 receives a voltage and forms a controlled electric field with the first electrode unit to control the arrangement of the liquid crystal molecules between the second electrode unit 24 and the first electrode unit, so as to form a lens. Since the second electrode units disposed at different positions of the second substrate have different structural parameters (including the width and orientation interval of the electrodes), the lenses so formed have different structures. The structural parameters of the second electrode unit are related the curvature of the second substrate and specifically related to the orientation position of the second electrode unit. Compared with the conventional planar display screen or curved display screen adopting the liquid crystal lenses with the same structural parameters for the naked-eye 3D display, the display device uses liquid crystal lenses with different structural parameters for the naked-eye 3D display through the principle of refraction, and such display device not just reduces the cross-talk problem of the naked-eye 3D display only, but also fixes its position to the best viewing position to improve the visual enjoyment of the users.

While the invention has been described by means of specific embodiments, numerous modifications and variations could be made thereto by those skilled in the art without departing from the scope and spirit of the invention set forth in the claims.

What is claimed is:

1. A liquid crystal lens, comprising:
   a first substrate;
   a second substrate, disposed opposite to the first substrate, wherein both of the first substrate and second substrate are curved substrates;
   a first electrode unit, disposed on the first substrate;
   a plurality of second electrode units, disposed on the second substrate, and including a plurality of electrode units with a first structure and a plurality of electrode units with a second structure, wherein the electrode units with the first structure are disposed on both sides of the second substrate respectively, and the electrode units with the second structure are disposed at a center position of the second substrate, and each of the electrode units with the first structure comprises a plurality of electrodes with different widths and intervals, and each of the electrode units with the second structure comprises a plurality of electrodes with a same width and interval; and
   a liquid crystal layer, disposed between the first electrode unit and the plurality of second electrode units, wherein a plurality of liquid crystal molecules corresponding to the plurality of the second electrode units form a plurality of lenses under an effect of a controlled electric field produced by the plurality of second electrode units and the first electrode unit, and at least some of the lenses have different structures;
   wherein both of the first substrate and the second substrate have an adjustable curvature; and
   each of the plurality of second electrode units is configured to, when a voltage is applied thereto, form a different controlled electric field based on a changed curvature of the first substrate and the second substrate.

2. The liquid crystal lens of claim 1, wherein a plurality of liquid crystal molecules corresponding to the electrode units with the first structure forms a plurality of lenses with different structures under the effect of the controlled electric field produced by the plurality of second electrode units and the first electrode unit.

3. The liquid crystal lens of claim 2, wherein a plurality of liquid crystal molecules corresponding to the electrode units with the second structure forms a plurality of lenses with a same structure under the effect of the controlled electric field produced by the plurality of second electrode units and the first electrode unit.

4. A liquid crystal lens, comprising:
   a first substrate;
   a second substrate, disposed opposite to the first substrate, wherein both of the first substrate and second substrate are curved substrates;
   a first electrode unit, disposed on the first substrate;
   a plurality of second electrode units, disposed on the second substrate; and
   a liquid crystal layer, disposed between the first electrode unit and the plurality of second electrode units, wherein a plurality of liquid crystal molecules corresponding to the plurality of the second electrode units form a plurality of lenses under an effect of a controlled electric field produced by the plurality of second electrode units and the first electrode unit, and at least some of the lenses have different structures;
   wherein both of the first substrate and the second substrate have an adjustable curvature; and
   each of the plurality of second electrode units is configured to, when a voltage is applied thereto, form a different controlled electric field based on a changed curvature of the first substrate and the second substrate.

5. The liquid crystal lens of claim 4, wherein the plurality of second electrode units comprises an electrode unit with a first structure and the electrode unit with the first structure comprises a plurality of electrodes with different widths and intervals.

6. The liquid crystal lens of claim 5, wherein the plurality of second electrode units comprises an electrode unit with a second structure and the electrode unit with the second structure comprises a plurality of electrodes with a same width and interval.

7. A display device, comprising:
- a display panel, comprising a plurality of column pixel units;
- a liquid crystal lens, disposed on the display panel, and comprising a first substrate and a second substrate disposed opposite to the first substrate, wherein both of the first substrate and second substrate are curved substrates;
- a first electrode unit, disposed on the first substrate;
- a plurality of electrode units, disposed on the second substrate; and
- a liquid crystal layer, disposed between the first electrode unit and the plurality of second electrode units, wherein a plurality of liquid crystal molecules corresponding to the plurality of the second electrode units form a plurality of lenses under an effect of a controlled electric field produced by the plurality of second electrode units and the first electrode unit, and at least some of the lenses have different structures;
- wherein both of the first substrate and the second substrate have an adjustable curvature; and
- each of the plurality of second electrode units is configured to, when a voltage is applied thereto, form a different controlled electric field based on a changed curvature of the first substrate and the second substrate.

8. The display device of claim 7, wherein each second electrode unit at least corresponds to two column pixel units.

9. The display device of claim 7, wherein the plurality of second electrode units comprises an electrode unit with a first structure and the electrode unit with the first structure comprises a plurality of electrodes with different widths and intervals.

10. The display device of claim 9, wherein the plurality of second electrode units comprises an electrode unit with a second structure and the electrode unit with the second structure comprises a plurality of electrodes with a same width and interval.

11. The display device of claim 10, wherein the electrode unit with the first structure is disposed on both sides of the second substrate, and the electrode unit with the second structure is disposed at a center position of the second substrate.

* * * * *